United States Patent [19]

Takahashi

[11] Patent Number: 5,548,358
[45] Date of Patent: Aug. 20, 1996

[54] IMAGE PROJECTING DEVICE

[75] Inventor: Hiroshi Takahashi, Kawasaki, Japan

[73] Assignee: Ricoh Company, Ltd., Tokyo, Japan

[21] Appl. No.: 455,599

[22] Filed: May 31, 1995

[30] Foreign Application Priority Data

Jun. 1, 1994  [JP]  Japan ................................. 6-120274
Oct. 13, 1994  [JP]  Japan ................................. 6-247893

[51] Int. Cl.$^6$ ................................................. G03B 21/28
[52] U.S. Cl. .................................... 353/122; 353/DIG. 3
[58] Field of Search ........................... 353/122, DIG. 4, 353/DIG. 3; 355/233, 235; 359/72

[56] References Cited

U.S. PATENT DOCUMENTS

| | | | |
|---|---|---|---|
| 4,392,719 | 7/1983 | Sekimoto | 359/72 |
| 4,811,110 | 3/1989 | Ohmura | 353/119 |
| 4,839,731 | 6/1989 | Saka | 353/DIG. 3 |
| 4,851,924 | 7/1989 | Nakamura et al. | 353/DIG. 3 |
| 4,903,079 | 2/1990 | MacAndrew | 355/235 |
| 5,113,225 | 5/1992 | Deguchi | 355/235 |
| 5,214,457 | 5/1993 | Takauashi et al. | 353/122 |
| 5,325,137 | 6/1994 | Konno et al. | 359/72 |
| 5,367,359 | 11/1994 | Takauashi et al. | 359/72 |
| 5,379,095 | 1/1995 | Oishi | 355/235 |
| 5,414,481 | 5/1995 | Fujioka et al. | 353/DIG. 3 |

FOREIGN PATENT DOCUMENTS

| | | |
|---|---|---|
| 3-17615 | 1/1991 | Japan . |
| 4-36742 | 2/1992 | Japan . |

*Primary Examiner*—William C. Dowling
*Attorney, Agent, or Firm*—Oblon, Spivak, McClelland, Maier & Neustadt, P.C.

[57] ABSTRACT

In an image projecting device for optically projecting the image of a document onto a screen, a film responsive to light is capable of changing, when illuminated, its state for selectively transmitting or diffusing incident light. More than one mirrors are provided for reflecting a reflection from a document image. A focusing lens focuses light reflected from the more than one mirrors onto the film to thereby transfer the document image to the film. A light source illuminates the film in which he document image is formed. A projecting unit projects, in an enlarged scale, light issuing from the light source and being transmitted through the film.

19 Claims, 14 Drawing Sheets

IMAGE PROJECTING DEVICE

BACKGROUND OF THE INVENTION

1. Field of the Invention

The present invention relates to an image projecting device for optically projecting the image of a document onto a screen and, more particularly, to a plain paper projector (PPP) capable of projecting the image of a document implemented by a plain paper.

2. Discussion of the Background

It is a common practice with a conventional OHP (Over Head Projector) or a slide projector to use a transparent sheet, i.e., an OHP sheet or a slide sheet, as taught in Japanese Patent Laid-Open Publication No. 4-128734 by way of example. When light transmitted through the transparent sheet is projected onto a screen, an image provided on the sheet is projected in an enlarged scale. However, this kind of projecting device is not operable with a document implemented by an opaque plain paper, not to speak of a thick book document. With such an extra document, the user must write an image on the transparent sheet by hand or transfer it to the sheet by use of a copier, consuming time and labor.

In light of the above, Japanese Patent Laid-Open Publication No. 4-149417, for example, proposes a semioptical and semielectrical projecting device capable of projecting light transmitted through an electrically driven TFT (Thin Film Transistor) type liquid crystal display device. This type of projecting device photoelectrically transduces the image of a document, electrically writes the transduced image in the display device, and then optically projects the image on a screen in an enlarged scale. The device has another advantage that the operation for replacing the document is not necessary because images to be projected are transformed to electrical signals beforehand.

However, a problem with the projecting device using the TFT type display device is that because the display device is driven electrically, a scanner for reading a document and a digital image processing device are bulky and expensive. Another problem is that the device is troublesome to operate. In addition, because the display device requires a TFT for every pixel, it is difficult provided it with a great size due to the limited yield.

There has been proposed a PPP capable of transferring the image of a plain paper document to a composite polymer and liquid crystal film, which is a specific form of a liquid crystal film responsive to light, via a lens array, and then projecting the image transferred to the film. However, the focal depth available with a lens array is too small to avoid blurring when the document slightly rises above a platen or has a tridimensional configuration.

SUMMARY OF THE INVENTION

It is, therefore, an object of the present invention to provide a miniature and inexpensive image projecting device capable of projecting the image of a plain paper document.

It is another object of the present invention to provide an image projecting device capable of projecting a plain paper document without blurring by simple manipulation.

An image projecting device of the present invention has a film responsive to light and capable of changing, when illuminated, its state for selectively transmitting or diffusing incident light, more than one mirror for reflecting a reflection from the image of a document, a focusing lens for focusing the light reflected from the more than one mirror onto the film to thereby transfer the image of the document to the film, a light source for illuminating the film, and a projecting unit for projecting, in an enlarged scale, light issuing from the light source and being transmitted through the film.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
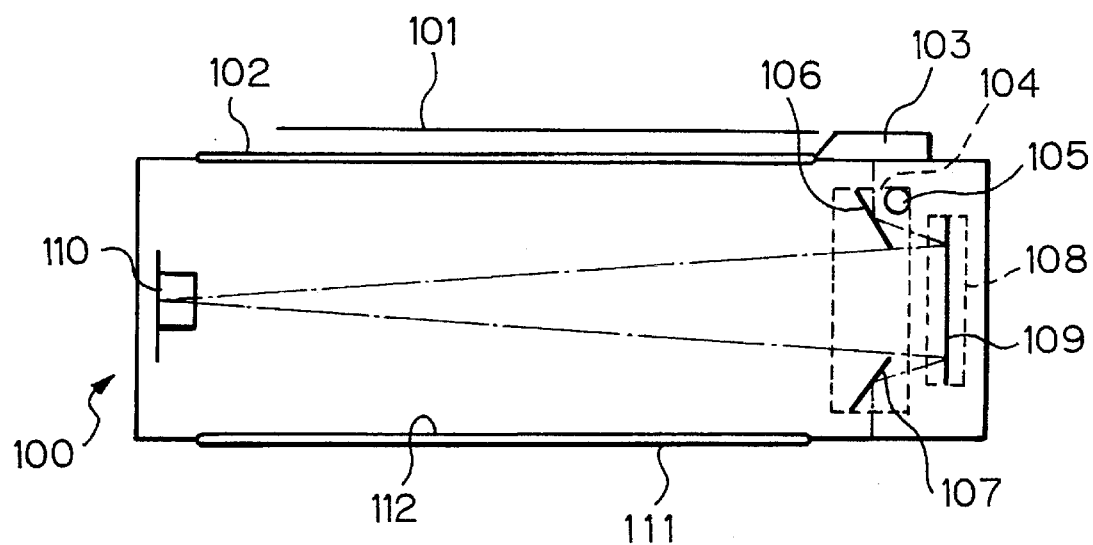
FIG. 1 is a side elevation showing an image projecting device embodying the present invention in a scan start condition.

Referring to FIGS. 1–7, a first embodiment of the image projecting device in accordance with the present invention is shown. As shown in FIG. 1, the embodiment is implemented as a ×1 in-mirror lens PPP 100 including a glass platen 102. A document 101 is laid on the glass platen 102 face down and positioned by a scale 103. A first carriage 104 has a lamp 105 for illuminating the document 101 in the widthwise direction via a slit, a first mirror 106 for reflecting a reflection from the document 101, and a third mirror 107 for reflecting the document image onto a composite polymer and liquid crystal film 111 located on the bottom of the projector 100. The film 111 is parallel to the glass platen 102, i.e., the document 101 laid thereon. A color filter 112 is provided on the film 111. A second carriage 108 has a second mirror 109 for reflecting the light from the first mirror 106 toward an in-mirror lens 110, and for steering the light focused and reflected by the lens I 10 toward the third mirror 107. The in-mirror lens 110 is made up of a hemispherical focusing lens and a mirror.

Figure 2:
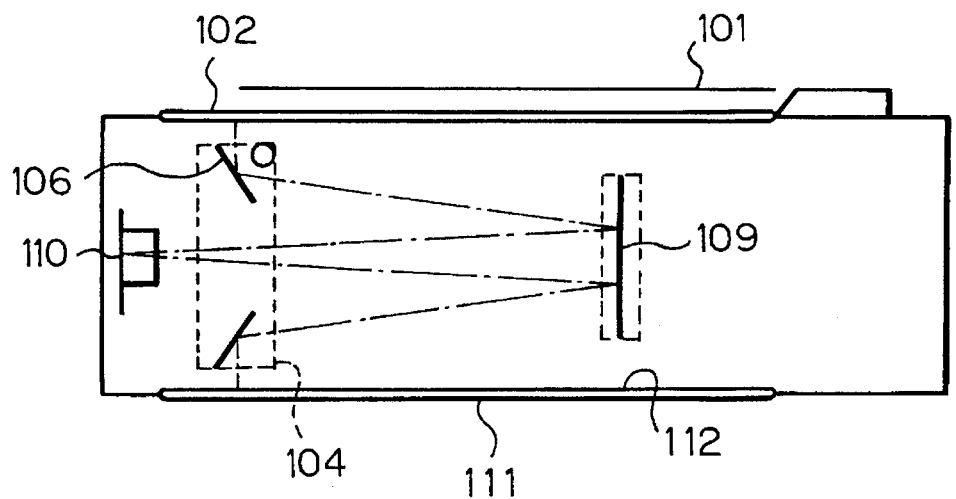
FIG. 2 is a side elevation showing the embodiment in a scan end condition.
Figure 3:
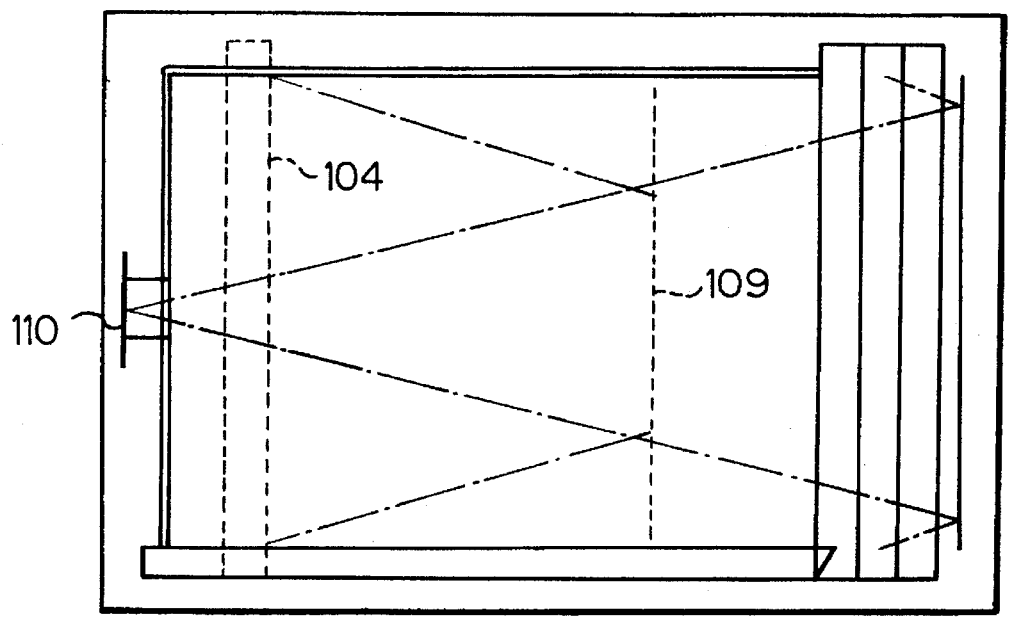
FIG. 3 is a top plan view of the embodiment in the scan end condition.

The second carriage 108 is moved at a speed one half of the speed of the first carriage 104. As a result, as shown in FIGS. 2 and 3, the document 101 on the glass platen is scanned in the lengthwise direction thereof. The resulting imagewise light is sequentially routed through the mirror 106, mirror 109, in-mirror lens 110, mirror 109 and mirror 107, forming a 1:1 document image in the composite polymer and liquid crystal film 111 via the color filter 112.

Figure 4:
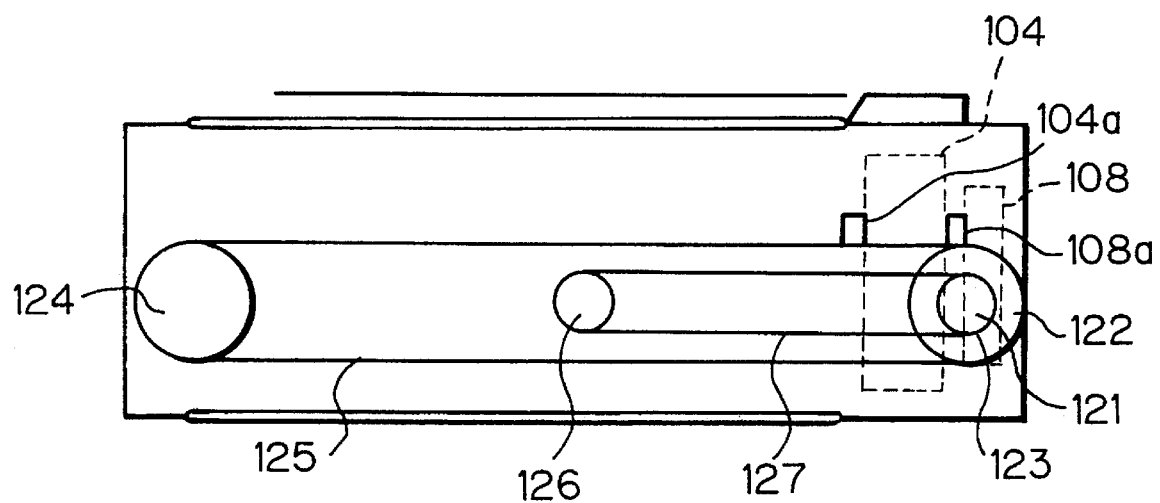
FIG. 4 is a side elevation of a mechanism for driving a first carriage and a second carriage included in the embodiment.

As shown in FIG. 4, the two carriages 104 and 108 are driven by a single stepping motor 121. An outer gear 122 and an inner gear 123 are connected to the output shaft of the motor 121. The number of teeth of the inner gear 123 is one half of the number of teeth of the outer gear 122. A timing belt 125 is passed over the gear 122 and a gear 124 while a timing belt 127 is passed over the gear 123 and a gear 126. The carriages 104 and 108 are respectively clamped to the timing belts 125 and 127, as at 104a and 108a. When the motor 12 1 is rotated counterclockwise, the carriages 104 and 108 are respectively moved at the speeds of, for example, about 100 mm/sec and about 50 mm/sec. As a result, both the glass platen 102 and the film 111 can be scanned over their entire surfaces. For example, a document of size A4 can be scanned and transferred to the film 111 in about 3 seconds.

Figure 5C:
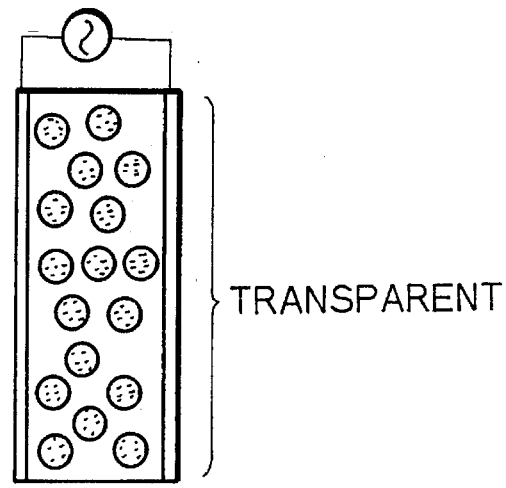
FIGS. 5A–5C; demonstrate the behavior of a composite polymer and liquid crystal film included in the embodiment.
Figure 5B:
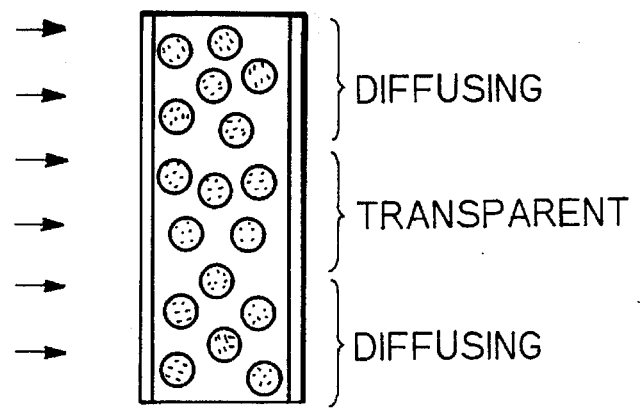
Figure 5A:
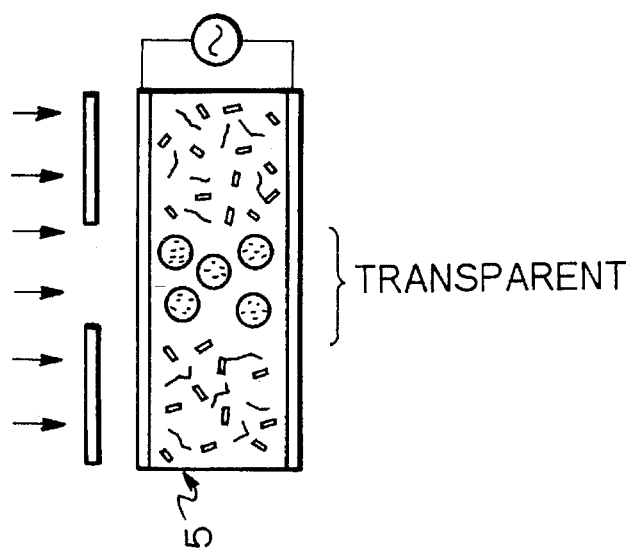

A reference will be made to FIGS. 5A–5C for describing the principle of operation of the film 111. To begin with, in the film 111, a material produced by photopolymerization selectively transmits or diffuses incident light, depending on the presence/absence of an electric field. Photopolymeric compositions include, for example, cyanobiphenyl-based liquid crystals, and bifunctional acrylate oligomer (molecular weight: 200) and monomer (2-hydroxyethyl acrylate). The film 111 is set beforehand such that the refractive index of the matrix and the ordinary rays refractive index of the liquid crystal coincide. As shown in FIG. 5 A, when light is selectively incident to the film 111 while an electric field is applied to the film 111, the crystal in the illuminated part is polymerized due to phase separation with the result that the entire phase becomes transparent. The transparent state remains even when the electric field disappears, because the orientation is fixed.

When the above composition is simply photopolymerized, the crystal phase is also sequentially separated from the matrix. However, because the orientation of the crystal layer is random, the composition becomes opaque by diffusing light due to a difference in spatial refractive index, as shown in FIG. 5B. In this condition, when a voltage is applied to the film 111, the crystal is oriented in the direction of the resulting electric field with the result that the refractive index of the crystal portion and that of the matrix portion coincide. As a result, the film 111 becomes transparent, as shown in FIG. 5C. Hence, although the transmissivity noticeably changes depending on the ON/OFF of the electric field, it is possible to optically transfer the document image of a plain paper document without resorting to photoelectric conversion.

In the illustrative embodiment, the optical path set up by the mirrors 106, 107 and 109 and in-mirror lens 110 has a substantial length and provides the document plane with a greater depth than in the conventional optics using a lens array. Therefore, it is possible to form the image of the document 101 on the film 111 without blurring even if the document 101 slightly rises above the glass platen 102 or has a tridimensional configuration.

Figure 6:
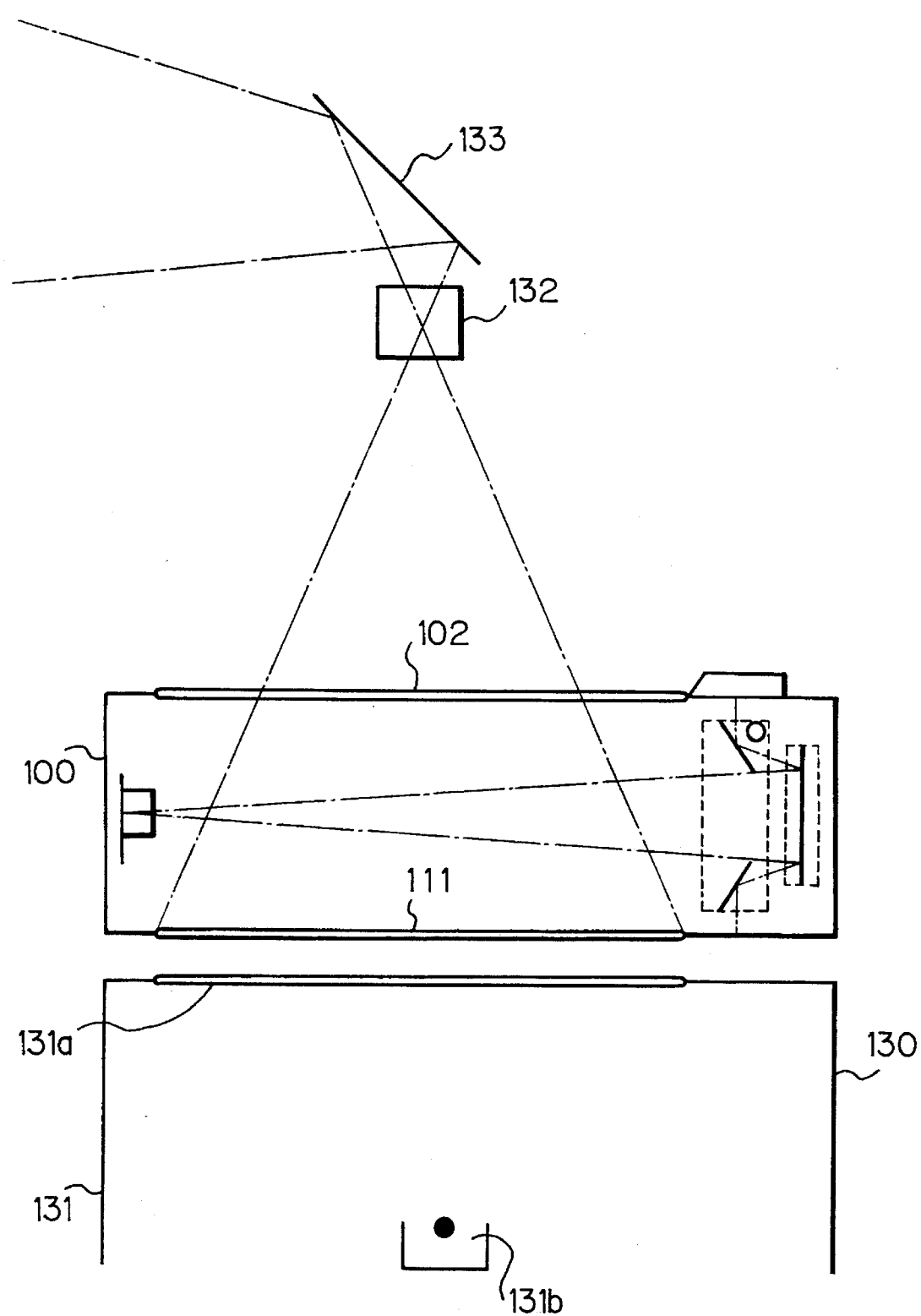
FIG. 6 is a side elevation showing the embodiment in a projection condition.

How the device projects an image formed in the film 111 will be described with reference to FIG. 6. The device has an OHP 130 in addition to the PPP body 100. The OHP 130 has a casing 131 having a glass 131a on the top and accommodating a lamp 131b thereinside. A transparent OHP sheet is laid on the glass 131. A projecting lens 132 and a projecting mirror 133 are also included in the OHP 130 in order to project the OHP sheet onto a screen, not shown. The lens 132 and mirror 133 are supported by the casing 131 by support members, not shown. To project the image formed in the film 111, the PPP body 100 is mounted on the glass 31a, and then the lamp 131b illuminates the film 111 via the glass 131a. The light transmitted through the film 111 i s transmitted through the glass platen 102 and then enlarged by the lens 132. The enlarged image from the lens 132 is steered by the mirror 133 toward the screen.

As shown in FIG. 1, in the PPP body 100, the document image is sequentially reflected by the mirrors 106 and 109, in-mirror lens 110, and mirrors 109 and 107 five times, i.e., an odd number of times. Hence, the image formed on the film 111 is a non-inverted image, as seen from the above. It is a common practice with a purely optical OHP to lay a document on a glass face up, i.e., in a non-inverted position, and to reflect light from the document by an odd number of mirrors in order to project a non-inverted image onto a screen. The embodiment, therefore, can project a non-inverted image on the screen even when such a conventional OHP is used.

The embodiment uses the composite polymer and liquid crystal film 111 as a liquid crystal film responsive to light. If desired, the film 111 may be replaced with an FLC (Ferroelectric Liquid Crystal) with which an azobenzene derivative, for example, is mixed, as reported in "NATURE", Vol. 361 4, Feb., 1993. The derivative is responsive to light. Specifically, the FLC containing the derivative is sealed between ITO (indium oxide) films which are transparent conductive films and spaced apart by a gap of 2 μm.

Figure 7A:
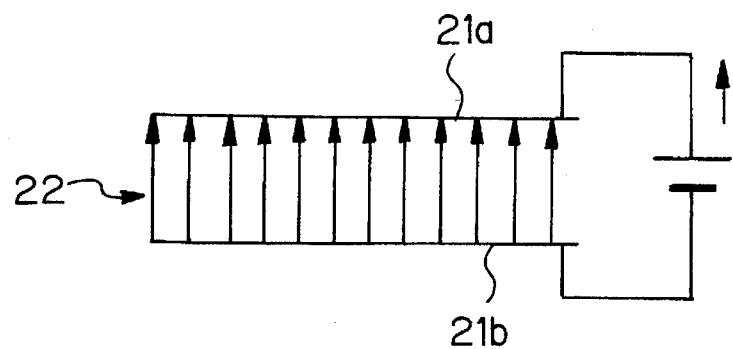
FIGS. 7A–7C demonstrate the behavior of another liquid crystal film responsive to light.
Figure 7B:
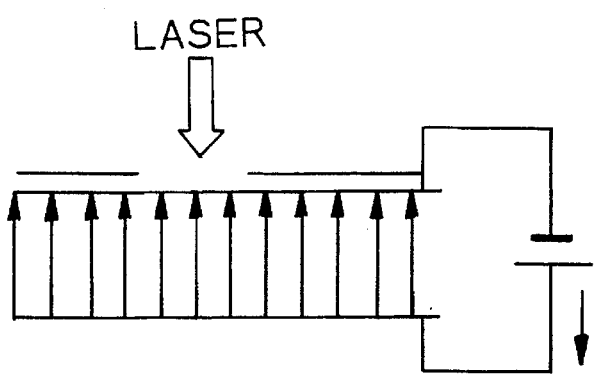
Figure 7C:
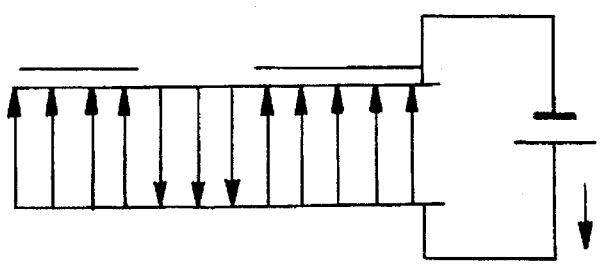

Referring to FIGS. 7A–7C, the behavior of the above liquid crystal will be described. As shown in FIG. 7A, a voltage of several volts is applied to between ITO films 21a and 21b. Then, as shown in FIG. 7B, the polarity of the voltage is inverted, and an image is projected (or a laser beam is applied). As a result, as shown in FIG. 7C, the phase of a liquid crystal 22 between the films 21a and 21b changes depending on the incident light, forming an image in the crystal 22. The image formed in the crystal 22 remains unless the polarity of the voltage is inverted.

FIGS. 8–12 show a second embodiment of the present invention. As shown, the in-mirror lens 110 is replaced with a through lens 156. The optical path from the document 101 to the lens 156 and the optical path from the lens 156 to the film 111 are provided with the same length in order to effect 1:1 image formation. In a modification shown in FIG. 9, a through lens 174 is movable along an optical path to selectively form a 1:1 image or an enlarged image.

Figure 8:
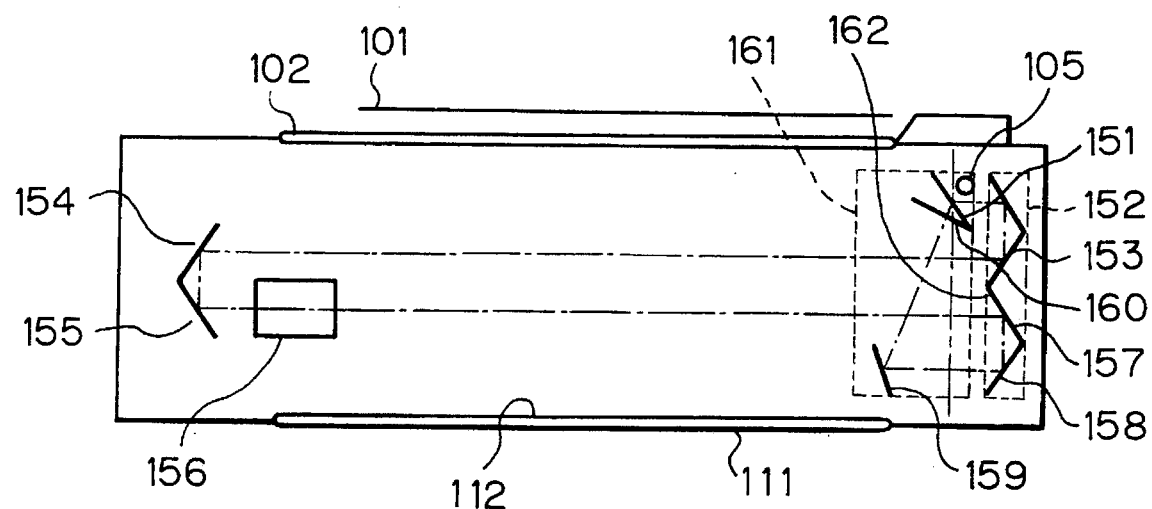
FIG. 8 is a side elevation showing a second embodiment of the present invention in a scan start condition.

As shown in FIG. 8, the document 101 on the glass platen 102 is illuminated by the lamp 105 through a slit. The resulting reflection from the document 101 is reflected by a first mirror 151, a second mirror 152, a third mirror 153, a fourth mirror 154 and a fifth mirror 155 at an angle of 90 degrees each. The through lens 156 focuses the incident imagewise light. A sixth mirror 157 and a seventh mirror 158 reflect the incident light at an angle of 90 degrees each. An eighth mirror 159 and a ninth mirror 160 reflect the incident light downward. As a result, the document image is formed in the film 111 via the color filter 112. The image formed in the film 111 is also a non-inverted image because the number of mirrors is nine, i.e., odd. A first carriage 161 is loaded with the lamp 105 and mirrors 151, 159 and 160 while a second carriage 162 is loaded with the mirrors 152, 153, 157 and 158. The mirrors 154 and 155 and lens 156 are fixed in place. During scanning, the carriage 162 moves at a speed one half of the speed of the carriage 161, thereby forming a 1:1 image in the film 111.

In this embodiment, the optical path set up by the nine mirrors and through lens 156 also has a substantial length and provides the document plane with a greater focal depth than in the conventional optics implemented by a lens array. Therefore, it is possible to form the image of the document 101 in the film 111 without blurring even if the document 101 slightly rises above the glass platen 102 or has a tridimensional configuration.

Figure 9:
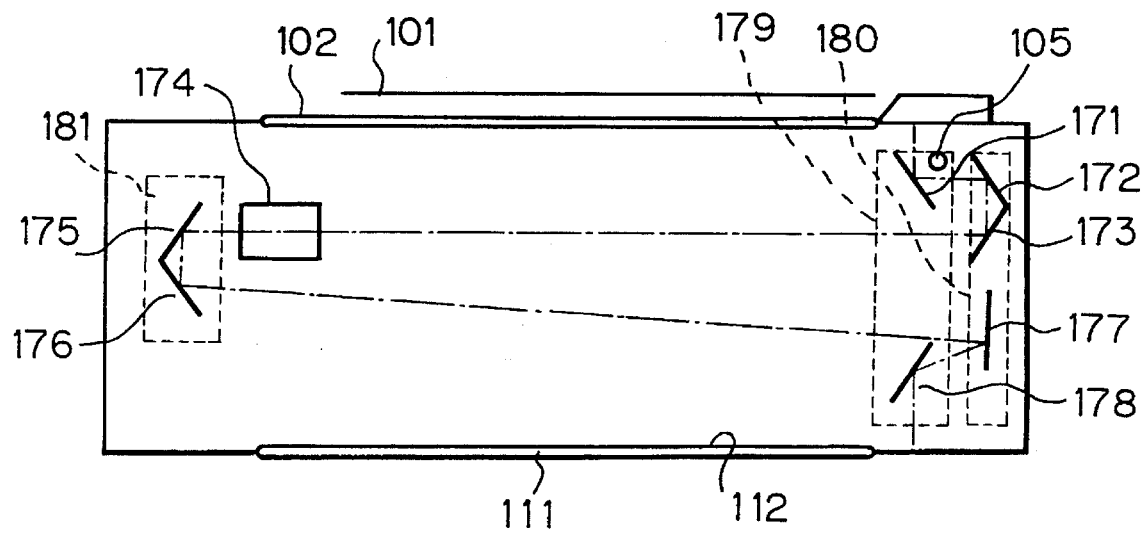
FIG. 9 is a side elevation showing a modification of the second embodiment in a scan start condition.
Figure 10:
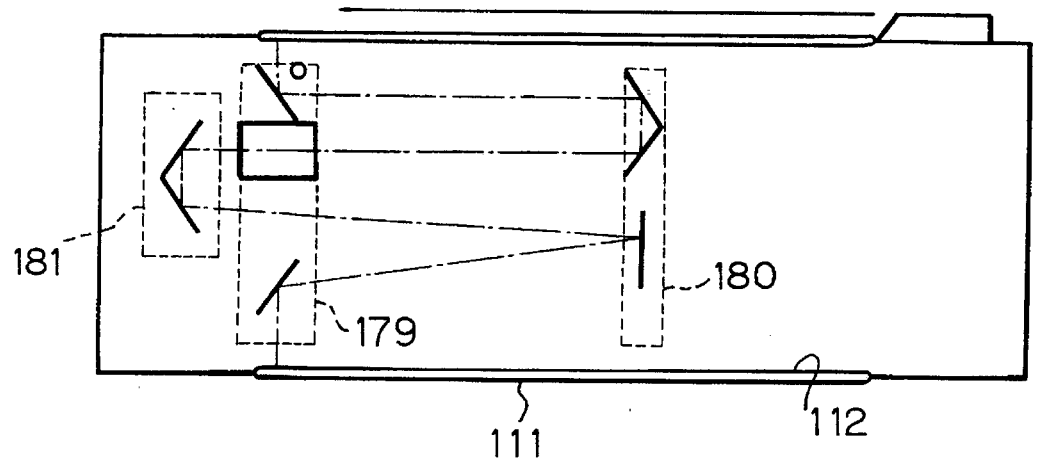
FIG. 10 is a side elevation showing the modification in a scan end condition.

FIG. 9 shows a modification of the second embodiment. As shown, when tile lamp 105 illuminates the document 101 on the glass platen 102, the resulting reflection is reflected by a first mirror 171, a second mirror 172 and a third mirror 173 at an angle of 90 degrees each. A through lens 174 focuses the incident imagewise light. A fourth mirror 175, a fifth mirror 176, a sixth mirror 177 and a seventh mirror 178 reflect the incident light downward. As a result, the document image is formed in the film 111 via the color filter 112. The lamp 105 and mirrors 171 and 178 are mounted on a first carriage 179 while the mirrors 172, 173 and 177 are mounted on a second carriage 180. Further, the mirrors 175 anti 176 are mounted on a third carriage 181. As shown in FIG. 10, during scanning, the second carriage 180 is moved at a speed one half of the speed of the first carriage 179 while the third carriage 181 is fixed in place. Consequently, the document is formed in the film 111 in a 1:1 magnification.

Figure 11:
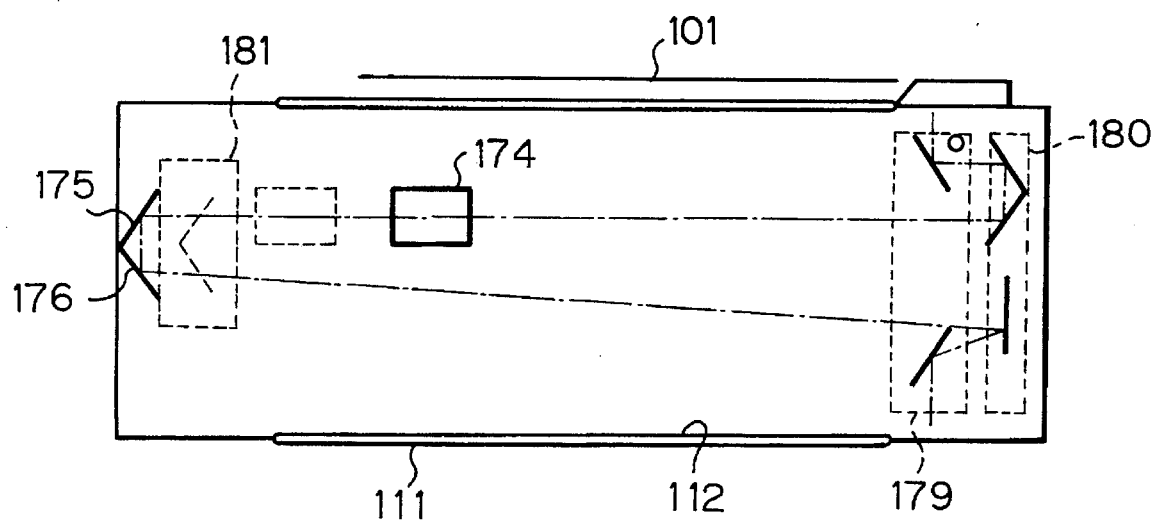
FIG. 11 is a side elevation showing the modification in a condition for forming an image in an enlarged scale.
Figure 12:
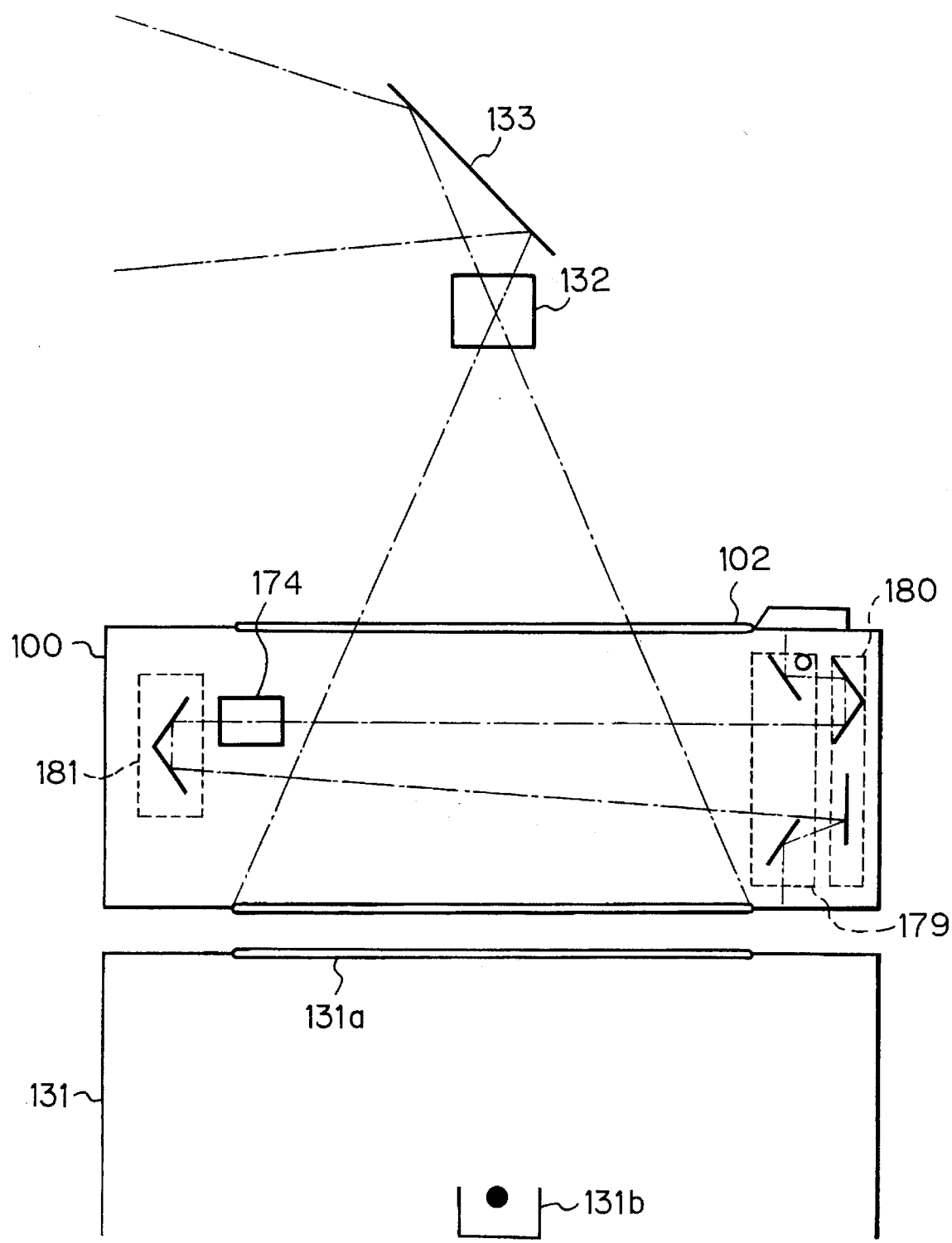
FIG. 12 is a side elevation showing the modification in a projection condition.
Figure 13:
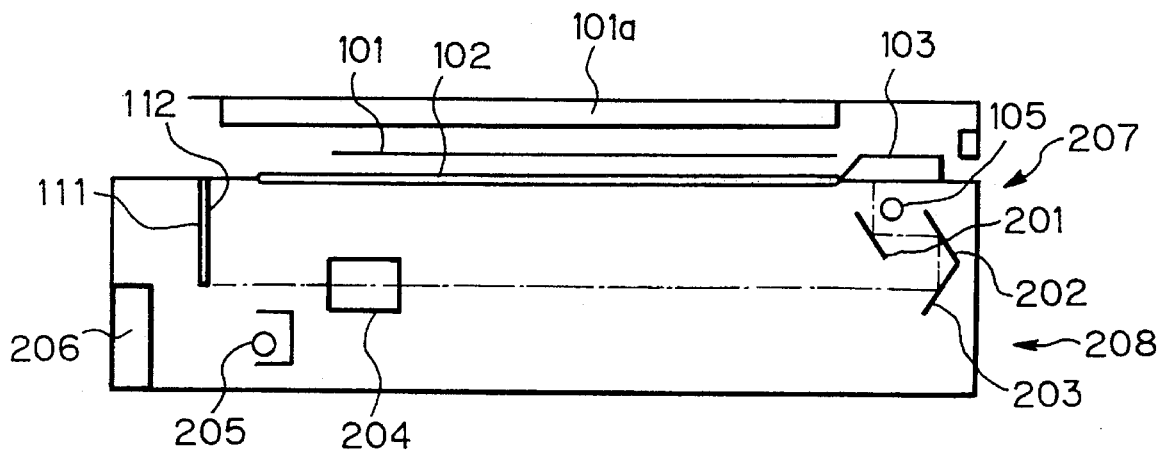
FIG. 13 is a side elevation showing a third embodiment of the present invention in a scan start condition.

FIG. 11 shows the modification in a condition for forming the document image in an enlarged scale. As shown, the through lens 174 is positioned close to the document 101, and the mirrors 175 and 176 on the third carriage 181 are positioned close to the film 111. The second carriage 180 is moved at a speed one half of the speed of the first carriage 179, thereby forming an enlarged image in the film 111. In this case, the lens 174 is moved also in the direction perpendicular to the sheet surface of FIG. 11 such that the document 101 and film 111 coincide at the right and left edges. As shown in FIG. 10, an arrangement is so made as to prevent the carriage 179 approaching the lens 174 from hitting thereagainst. FIG. 12 demonstrates the operation of the modification shown in FIG. 9. This operation is identical with the operation described with reference to FIG. 6 and will not be described in order to avoid redundancy. In FIG. 12, the same or similar constituents as or to the constituents shown in FIG. 6 are designated by the same reference numerals.

Figure 14:
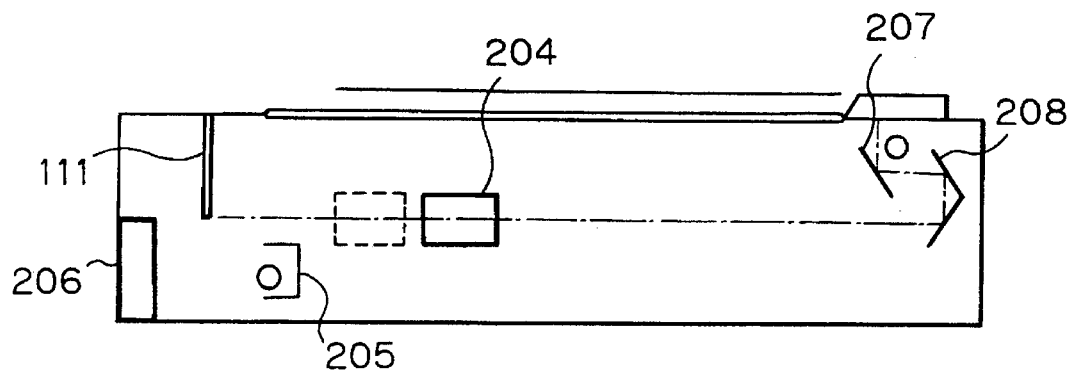
FIG. 14 is a side elevation representative of the movement of a zoom lens included in the third embodiment.
Figure 15:
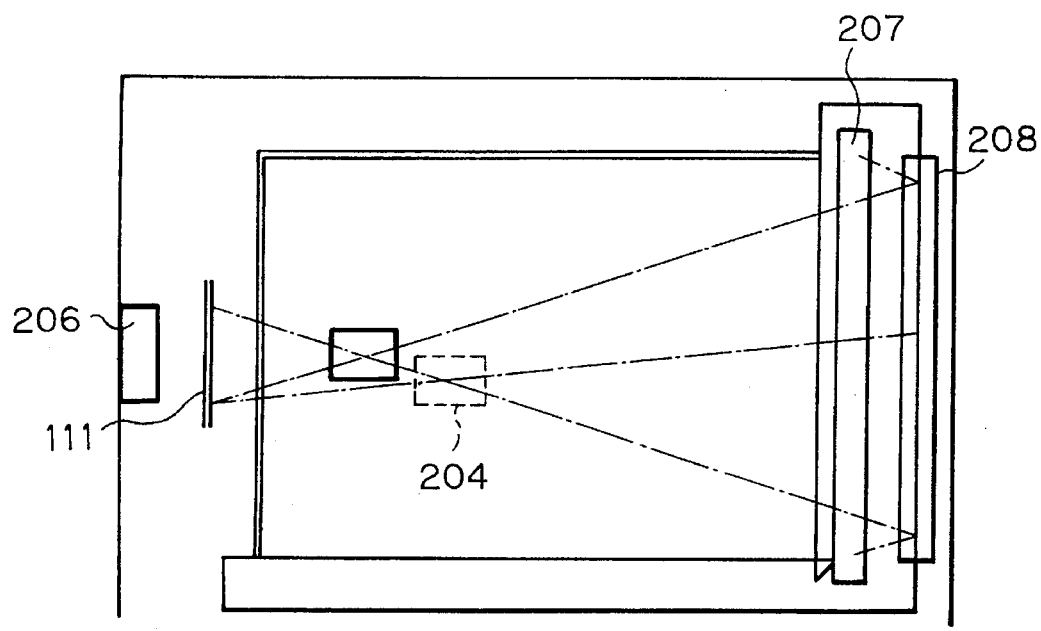
FIG. 15 is a top plan view of the third embodiment.

FIGS. 13 to 20 show a third embodiment of the present invention. As shown, the film 111 is positioned perpendicularly to the horizontal glass platen 102 and is movable in the vertical direction. During scanning, the lamp 105 illuminates the document 101, pressed by a cover plate 101a, through a slit. The resulting reflection is reflected by mirrors 201, 202 and 203. A zoom lens 204 changes the magnification of the incident light image in the widthwise direction of the document (perpendicularly to the optical axis). The light from the lens 204 forms the document image in the film 111. A lamp 205 and a lens 206 are provided for a projection purpose. The lamp 205 illuminates the film 111 while the zoom lens 206 projects the light transmitted through the film 111 on the screen in an enlarged scale. As shown in FIG. 14, the lens 204 is movable along the optical path to implement a desired reduction ratio. As shown in FIG. 15, the mirrors 201–203 are elongated in the direction perpendicular to the direction of movement of the lens 204.

Figure 16:
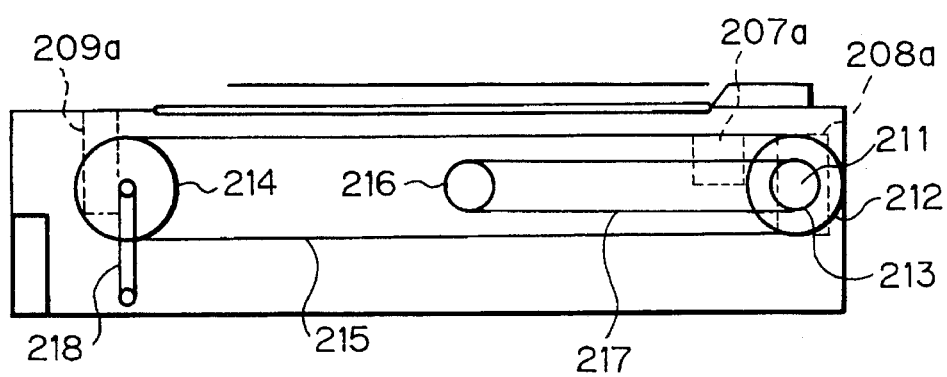
FIG. 16 is a side elevation of a drive mechanism included in the third embodiment.

The lamp 105 and mirror 201 are mounted on a first carriage 207 while the mirrors 202 and 203 are mounted on a second carriage 208. Further, the film 111 is mounted on a third carriage, not shown. As shown in FIG. 16, the first carriage 207, second carriage 208, and third carriage are driven by a single stepping motor 211. An inner gear 213 and an outer gear 212 are connected to the output shaft of the motor 211. The number of teeth of the gear 213 is one half of the number of teeth of the gear 212. A timing belt 215 is passed over the gear 212 and a gear 214 in a horizontal position. Likewise, a timing belt 217 is passed over the gear 213 and a gear 216 in a horizontal position. Further, a timing belt 218 is passed over the shaft of the gear 214 at one end thereof and extends vertically downward. The first carriage 207, second carriage 208 and third carriage are respectively clamped to the timing belts 215, 217 and 218, as at 207a, 208a and 209a. For a standard magnification, when the motor 211 is rotated counterclockwise, it moves the first carriage 207 at a speed of, for example, about 150 mm/sec, moves the second carriage 208 at a speed of about 75 mm/sec, and moves the third carriage at a speed of about 15 mm/sec. As a result, the image representative of the document 101 is reduced to one-tenth in the lengthwise direction.

For the standard magnification, the zoom lens 204 is brought to a position where the optical path from the lens 204 to the film 111 is one-tenth in length of the optical path from the lens 204 to the document 101. Consequently, the document image is formed in the film 111 in a one-tenth reduced scale. Hence, when the maximum reading size of the document 101 is of size A4, the film 111 and color filter 112 should only be sized about 30 mm longitudinally and about 22 mm laterally each. The embodiment is, therefore, practicable at lower cost than the previous embodiments. In addition, this embodiment is capable of forming the image of a document of size A4 in about 2 seconds.

Figure 19:
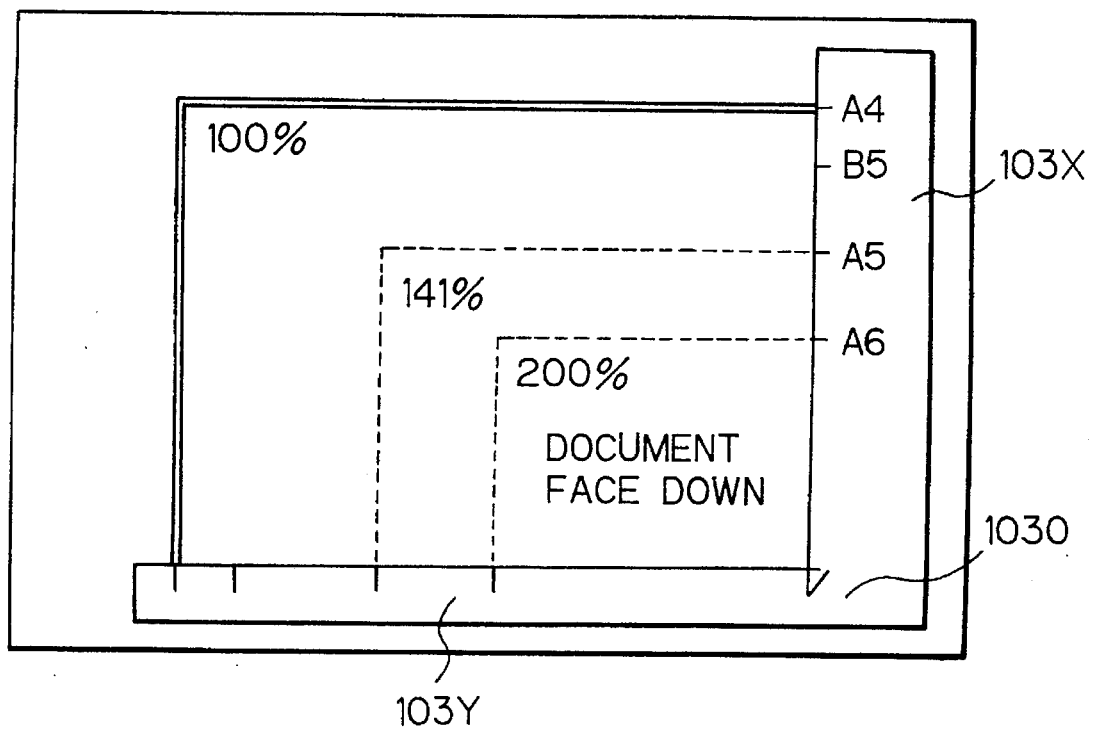
FIG. 19 is a top plan view of a scale included in the first to third embodiments.
Figure 20:
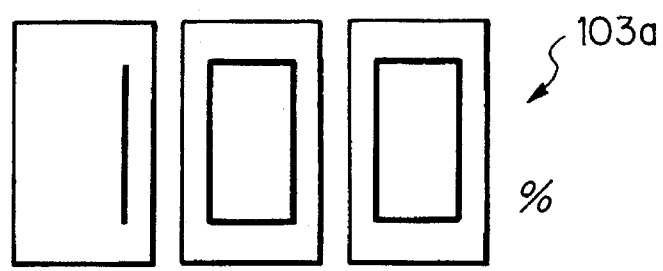
FIG. 20 shows a magnification display and magnification keys included in the third embodiment.
Figure 20:
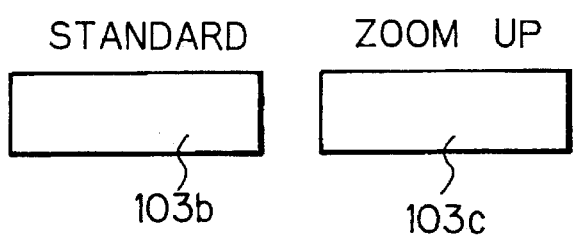

As shown in FIG. 14, the lens 204 is movable to a position matching a desired magnification by being driven by, for example, a stepping motor. For example, in the event of 200% enlargement, i.e., when the document 101 should be reduced to one-fifth, the lens 204 is moved to a position where the optical path to the film 111 is one-fifth in length of the optical path to the document 101. As a result, the document image in the film 111 has a doubled width, compared to the standard size. As shown in FIG. 19, the scale 103 is made tip of an X scale 103X and a Y scale 103Y which intersect each other at a point 1030. The document 101 is laid on the glass platen 102 by use of the intersecting point 1030 as a reference. Further, as shown in FIG. 20, a desired magnification change range may be entered on a 1% basis on a standard key 103b and a zoom-up key 103c, depending on the size of the document 101. Then, the entered magnification change ratio appears on a seven-segment, three-figure display 103a.

For the above magnification change, as shown in FIG. 15, the lens 204 is moved not only along the optical axis but also in the widthwise direction of the document 101 in order to bring the document 101 and the image in the film 111 into coincidence in width. At the same time, to change the magnification in the lengthwise direction, the scanning speed of the mirrors 201–203 is changed while the third carriage, i.e., the film 111 is moved at the standard speed. It is to be noted that when the film 111, is moved at a speed for the standard magnification change ratio, the third carriage may be driven by an exclusive drive mechanism or by the mechanism of FIG. 16 via a gear switching device.

Figure 17:
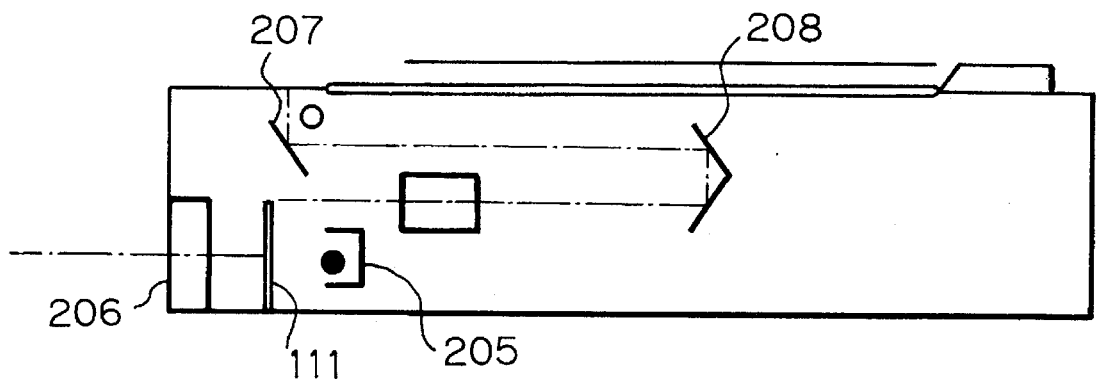
FIG. 17 is a side elevation showing the third embodiment in a projection condition.
Figure 18:
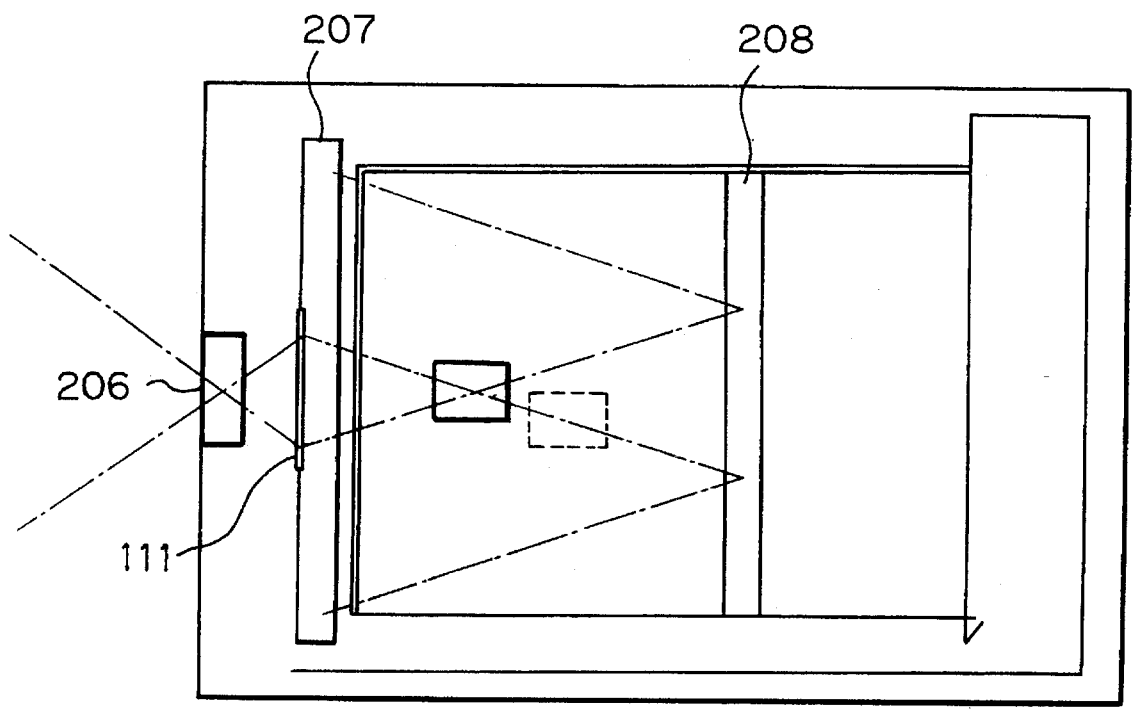
FIG. 18 is a top plan view of the third embodiment.

FIGS. 17 and 18 demonstrate a procedure for projecting the image formed in the film 111. As shown, the first carriage 207, second carriage 208 and third carriage are held in a halt at a position where scanning ends. The film 111 is brought to a stop at a position between the lamp 205 and the lens 206 assigned to projection. In this condition, when the lamp 205 illuminates the film 111, imagewise light transmitted through the film 111 is projected onto the screen in an enlarged scale.

Because the illustrative embodiment forms the image of the document 101 in the film 111 in an enlarged scale, it is practicable with a smaller lens than the previous embodiments. In addition, tile lamp 105 does not have to be of the kind emitting a great quantity of light. Further, the embodiment, like the previous embodiments, provides the document plane with a greater focal depth than in the conventional optics using a lens array. Therefore, it is possible to form the image of the document 101 in the film 111 without blurring even if the document 101 slightly rises above the glass platen 102 or has a tridimensional configuration.

Figure 21:
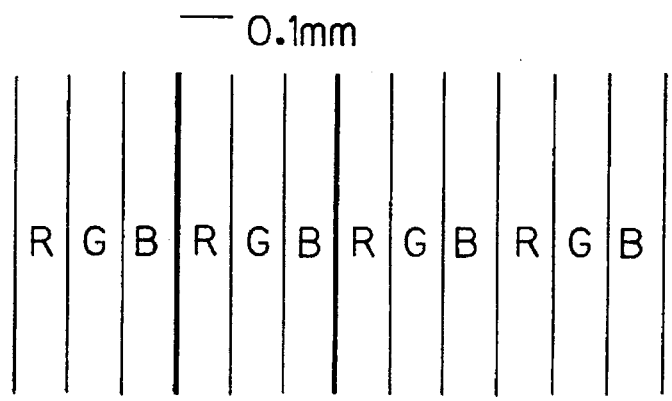
FIG. 21 shows an RGB color filter applicable to the embodiment.
Figure 22:
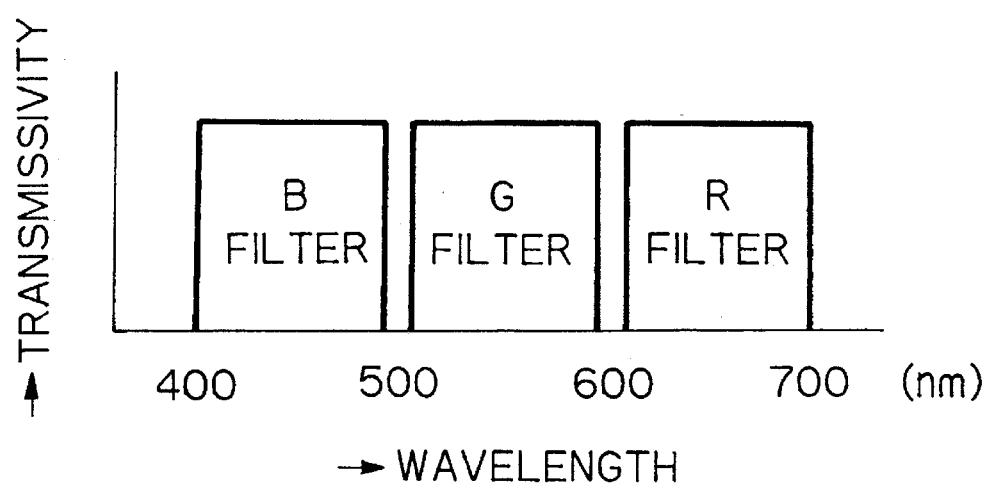
FIG. 22 shows the wavelength transmission characteristic of the filter shown in FIG. 21.

The color filter 112 will be described specifically. FIG. 21 shows an RGB stripe filter having R, G and B stripes in an alternating arrangement. FIG. 22 is representative of the wavelength transmission characteristic particular to the RGB stripe filter. As shown, the R, G and B stripes each transmit a particular range of the wavelength band of visible rays extending from 400 nm to 700 nm. The R, G and B components of the document image are also separated by the filter, and each is controlled as to the transmission through the film 111. This, coupled with the fact that the transmitted light is projected through the filter, causes the R, G and B components to be projected. However, not only the individual colors but also colors between them, based on the combination of gray levels, are projected to implement a full-color image on the screen.

In the event of document reading, the RGB stripe filter shown in FIG. 21 allows the corresponding color components of the reflection from the document to pass therethrough As a result, an image separated in color in stripes is formed in the film 111. At the time of projection, light transmitted through the R, G and B stripes of the filter is projected. Hence, although the color is separated and projected in the direction of the stripes to form a color image, the filter imposes no limitations in the direction perpendicular to the direction of the stripes. Therefore, the image is projected in a high resolution matching the resolution of the film 111.

The color filter has a pitch of 0.1 mm for the first and second embodiments (1:1 reading scheme) or a pitch of 0.02 mm for the third embodiment (reduction reading scheme); the pitches are the same in terms of the document position. Although the color pitch of the filter depends on the document image to be projected, the above pitches successfully implement a sufficient resolution even with a text document. Moreover, even with a document in the form of a photograph or carrying relatively large characters, they can implement a practical enlarged projection if at least the spatial color period is maintained less than 5 mm/period.

Figure 23:
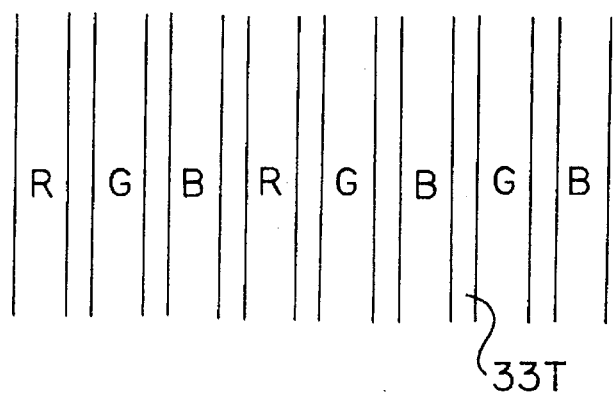
FIG. 23 shows a filter having a transparent portion between R, G and B stripes.

FIG. 23 shows another specific filter applicable to the present invention. As shown, a color filter has a transparent or blank stripe 33T between its R, G and B pixels (color portions). This kind of filter has a higher transmissivity than the filter shown in FIG. 21 and allows a bright image to be projected onto the screen. In addition, the projected image renders the light-color portions of the document more light and, therefore, has high contrast. Furthermore, if the transparent portions 33T are configured in a spatially periodic distribution to increase the transmissivity, an image with uniform brightness can be projected in the image space. Moreover, a light-color solid image portion having a substantial area is projected in a dot-like distribution similar to the tonality of an image. This kind of image appears as smooth as a printed image as to the gray scale.

In the first to third embodiments, the resolution of the device itself is determined by the color filter 112 because the document image is directly and purely optically formed in the film 111, and because the film 111 has a sufficiently high resolution. Hence, when use is made of the filter shown in FIG. 23, the space is separated in color by the filter in the horizontal direction while the transmissivity is increased by the transparent portions 33T in the vertical direction, in which the resolution of the filter imposes no limitations, without aggravating the resolution in the horizontal direction. As a result, a bright image is achievable on the screen.

In the first to third embodiments, the illuminating means for forming the document image in the film 111 is implemented by the lamp 105, and the illuminating means for projecting the image of the film 111 is also implemented by the lamp 131b or 205. The lamps 105 and 131b or 205 may be replaced with white fluorescent lamps, if desired. Then, because the light source of the scanning optics and that of the projecting optics have the same emission wavelength characteristic, desirable tonality is achievable without regard to the color characteristic of the document.

Figure 24:
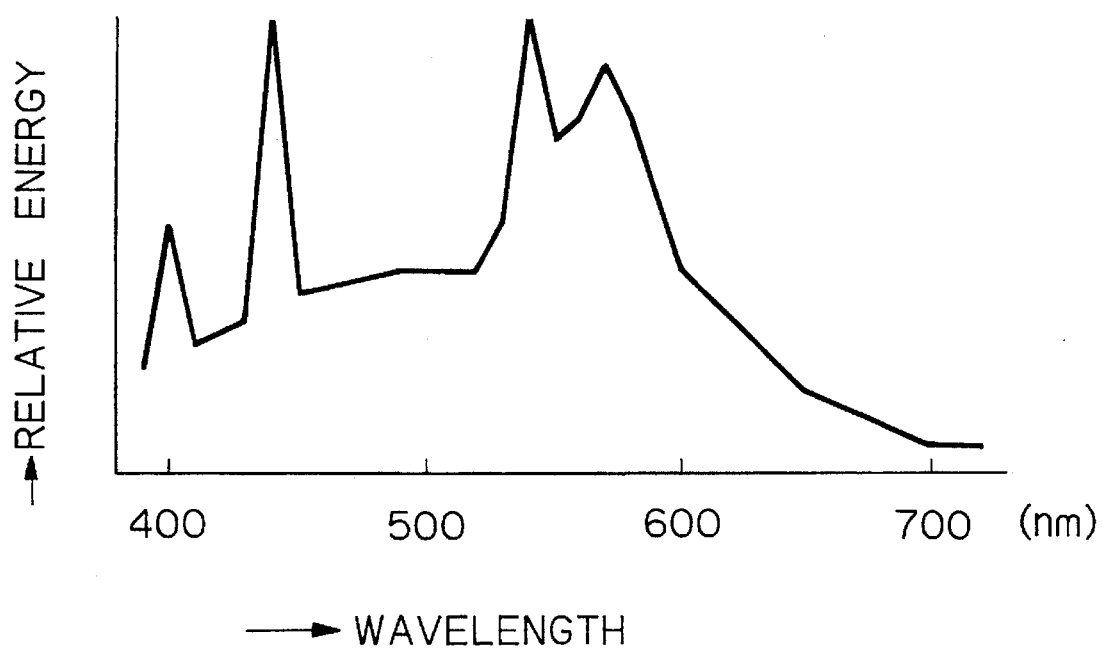
FIG. 24 shows the spectral distribution of a white fluorescent lamp.

As shown in FIG. 24, a white fluorescent lamp has some different peaks in the range of visible rays. In light of this, a filter for removing the peaks may advantageously be located in the vicinity or each fluorescent lamp or on the optical path thereof. With such filters, it is possible to focus the document image by separating the colors faithfully, and to reproduce and project it faithfully. Hence, a full-color image can be projected onto the screen without losing any one of the colors present on the document.

In summary, it will be seen that the present invention provides an image projecting device having various unprecedented advantages, as enumerated below.

(1) A reflection from a document is reflected by more than one mirror and then focused by a focusing lens onto a film responsive to light. As a result, the image of the document is transferred to the film. Hence, the device does not need a special document prepared beforehand, has a miniature and inexpensive construction, and can project a plain paper document by simple manipulation. In addition, the device provides a document plane with a greater focal depth than the conventional optics using a lens array, thereby obviating out-of-focus projection.

(2) The reflection from the document is reflected an odd number of times by more than one mirror and then transferred to the film. The image transferred to the film is projected onto a screen as a non-inverted image. The device is, therefore, capable of projecting the image in the same way as a purely optical OHP.

(3) A second carriage is moved at a speed one half of the speed of a first carrier during the course of scanning. Hence, the document image is transferred to the film in the real size. The device, therefore, does not need a special document prepared beforehand, has a miniature and inexpensive construction, and can project a plain paper document by simple manipulation.

(4) Because a second mirror mounted on the second carriage further reflects light from a fixed mirror, the optics is simple and low cost.

(5) Because the first carriage is loaded with a third mirror for reflecting the light from the second mirror, a lamp for illumination, a first mirror and a third mirror can be driven at the same time in a simple structure.

(6) Because the second mirror for reflecting the light from the first mirror and for further reflecting the light from the fixed mirror is implemented as a planar mirror, the device is low cost.

(7) The first and second carriages are driven by a single drive means, further enhancing the simple arrangement.

(8) The optics is further miniaturized because the fixed mirror is implemented as an in-mirror lens consisting of a focusing lens and a mirror.

(9) It is possible to project the light transmitted through the film in an enlarged scale by use of the illuminating means and projecting means included in a purely optical OHP. Therefore, a conventional OHP is usable if the film and the unit including more than one mirror and lens are dismounted and transported to a desired spot.

(10) Because the document image is transferred to the film in a reduced scale, the film and, therefore, the entire device can be reduced in size and cost.

(11) The document image can be reduced by simple control because the mirrors and the film are moved in synchronism with, but at different speeds from, each other.

(12) The illuminating means and projecting means have their optical paths located at a position which the film reaches at the end of image formation. This allows the image to be projected immediately after image formation.

(13) Because the plane of the document and that of the film are perpendicular to each other, the film can be located on the optical path of the mirror which scans the horizontal document. This implements the scanning of the mirror and that of the film in a simple structure and, in addition, reduces the overall thickness of the device.

(14) The lens is moved along the optical path to a position matching a desired magnification change ratio and is fixed there. This, coupled with the fact that more than one mirror and film are moved in synchronism with, but at different speeds from, each other, allows the document image to be formed in the film in a different magnification change ratio.

(15) The magnification is changed in such a way that the document is entirely or partly transferred to the entire area of the film without regard to the size of the document. Hence, the document image can be projected in a greater scale in any desired magnification change ratio greater than the standard ratio.

(16) Means for entering a desired magnification change ratio is provided and allows the user to project the document image onto the screen in any desired size.

(17) Because the document is set by use of the reference position, i.e., corner of a glass platen, it is easy for the user to set and project the document.

(18) The reference position is implemented by an L-shaped scale provided on the glass platen. Hence, the user can set the document, particularly a book document, on the glass platen easily.

(19) Because the top left corner of the document is selected to be the reference position, it is easy for the user to set a horizontally written document easily.

Various modifications will become possible for those skilled in the art after receiving the teachings of the present disclosure without departing from the scope thereof.

What is claimed is:

1. An image projecting device comprising: a film responsive to light and capable of changing, when illuminated, a state thereof for selectively transmitting or diffusing incident light;

at least three mirrors for reflecting a reflection from an image of a document while being moved;

a focusing lens for focusing light reflected from said at least three mirrors onto said film to thereby transfer the image of the document to said film;

illuminating means for illuminating said film; and projecting means for projecting, in an enlarged scale, light issuing from said illuminating means and which is transmitted through said film.

2. A device as claimed in claim 1, wherein said at least three mirrors reflect the incident light an odd number of times.

3. A device as claimed in claim 1, wherein an optical path between a plane of the document and said focusing lens and an optical path between said focusing lens and said film have lengths selected in such a ratio that the image of the document is transferred to said film in a reduced scale.

4. A device as claimed in claim 3, wherein an optical path of said illuminating means and an optical path of said projecting means are located at a position which said film reaches after image formation.

5. An image projecting device comprising:

a film responsive to light and capable of changing, when illuminated, a state thereof for selectively transmitting or diffusing incident light;

a plurality of mirrors for reflecting a reflection from an image of a document;

a focusing lens for focusing light reflected from said plurality of mirrors onto said film to thereby transfer the image of the document to said film;

illuminating means for illuminating said film;

projecting means for projecting, in an enlarged scale, light issuing from said illuminating means and which is transmitted through said film;

a first carriage movable in a direction for scanning the document, and loaded with a lamp for illuminating the document through a slit, and a first mirror for reflecting the reflection from the document;

a second carriage movable at a speed one half of a speed of said first carriage, and loaded with a second mirror for reflecting the light from said first mirror; and a fixed mirror for reflecting light from said second mirror.

6. A device as claimed in claim 5, wherein said second mirror further reflects the light from said fixed mirror.

7. A device as claimed in claim 5, wherein said first carriage is further loaded with a mirror third for reflecting the light from said second mirror.

8. A device as claimed in claim 5, wherein said second mirror comprises a planar mirror.

9. A device as claimed in claim 5, wherein said first and second carriages are driven by a single drive means.

10. A device as claimed in claim 5, wherein said fixed mirror comprises an in-mirror lens comprising a focusing lens and a mirror.

11. An image forming device comprising:
a film responsive to light and capable of changing, when illuminated, a state thereof for selectively transmitting or diffusing incident light;
a plurality of mirrors for reflecting a reflection from an image of a document;
a focusing lens for focusing light reflected from said plurality of mirrors onto said film to thereby transfer the image of the document to said film;
illuminating means for illuminating said film; and
projecting means for projecting, in an enlarged scale, light issuing from said illuminating means and which is transmitted through said film;
wherein said film, said plurality of mirrors and said focusing lens are removable from said illuminating means and said projecting means, and wherein illuminating means and projecting means of an optical overhead projector are capable of projecting, in an enlarged scale, the light transmitted through said film.

12. An image forming device comprising:
a film responsive to light and capable of changing, when illuminated, a state thereof for selectively transmitting or diffusing incident light;
a plurality of mirrors for reflecting a reflection from an image of a document;
a focusing lens for focusing light reflected from said plurality of mirrors onto said film to thereby transfer the image of the document to said film;
illuminating means for illuminating said film;
projecting means for projecting, in an enlarged scale, light issuing from said illuminating means and which is transmitted through said film;
wherein an optical path between a plane of the document and said focusing lens and an optical path between said focusing lens and said film have lengths selected in such a ratio that the image of the document is transferred to said film in a reduced state; and
wherein said focusing lens reduces the image of the document in scale in a widthwise direction while said plurality of mirrors and said film are movable in synchronism, but at different speeds from, each other, thereby transferring the image to said film in a scale reduced in a lengthwise direction.

13. An image forming device comprising: a film responsive to light and capable of changing, when illuminated, a state thereof for selectively transmitting or diffusing incident light;
a plurality of mirrors for reflecting a reflection from an image of a document;
a focusing lens for focusing light reflected from said plurality of mirrors onto said film to thereby transfer the image of the document to said film;
illuminating means for illuminating said film; and
projecting means for projecting, in an enlarged scale, light issuing from said illuminating means and which is transmitted through said film;
wherein an optical path between a plane of the document and said focusing lens and an optical path between said focusing lens and said film have lengths selected in such a ratio that the image of the document is transferred to said film in a reduced state; and
wherein the plane of the document and a plane of said film are perpendicular to each other.

14. An image forming device comprising:
a film responsive to light and capable of changing, when illuminated, a state thereof for selectively transmitting or diffusing incident light;
a plurality of mirrors for reflecting a reflection from an image of a document;
a focusing lens for focusing light reflected from said plurality of mirrors onto said film to thereby transfer the image of the document to said film;
illuminating means for illuminating said film; and
projecting means for projecting, in an enlarged scale, light issuing from said illuminating means and which is transmitted through said film;
wherein said focusing lens is moved to a position matching a magnification change ratio and fixed at said position, while said plurality of mirrors and said film are moved in synchronism with, but at different speeds from, each other.

15. A device as claimed in claim 14, wherein the image of the document is entirely or partly formed on an entire area of said film without regard to a size of the image.

16. A device as claimed in claim 14, further comprising means for allowing a desired magnification change ratio to be entered.

17. A device as claimed in claim 14, wherein a reference position of the document for forming an image in said film in a changed magnification is a reference position of a glass platen for laying the document.

18. A device as claimed in claim 17, further comprising an L-shaped scale for locating the document at said reference position.

19. A device as claimed in claim 18, wherein said reference position of the document corresponds to a top left corner of the document.

* * * * *